Patented Dec. 16, 1941

2,266,492

UNITED STATES PATENT OFFICE 2,266,492

CURING METHOD

Levi Scott Paddock and Cleo A. Rinehart, Chicago, Ill., assignors to Industrial Patents Corporation, Chicago, Ill., a corporation of Delaware No Drawing. Application May 17, 1939,
Serial No. 274,192

6 Claims. (Cl. 99—159)

This invention relates to curing meat.

One of the objects of the invention is to provide a method for obtaining a satisfactory cured color in the lean meat of bacon.

Other objects of the invention will be apparent from the description and claims which follow.

This invention is particularly concerned with an improvement in dry curing as distinguished from wet curing. As is well known, the wet or pickle method of curing involves preparation of a brine which is a water solution of certain curing salts, the most important of which is, of course, sodium chloride.

Sodium nitrate is used in conventional cures because it has some curative effect and is broken down by bacterial action into nitrite, which has the effect of fixing the characteristic red color of cured meat.

Dry curing, which is used chiefly in the curing of bacon, involves packing bacon bellies in layers in boxes, the curing salts being sprinkled over and around each layer of bellies. The bellies are permitted to remain in dry cure until completely cured, which usually requires about one month.

Considerable trouble is experienced in the commercial dry curing of bellies in an effort to obtain a satisfactory cured color in the lean meat. If reliance is placed upon the reduction of a nitrate to nitrite by bacterial action, difficulty is experienced in getting sufficient bacterial reduction to nitrite to give a good color. If nitrite salts are added directly to the curing mixture in the dry cure, it is difficult to obtain a satisfactory cured color, because the nitrite added to the curing mixture does not remain uniformly distributed throughout the curing mixture and does not soak into the fat to give a uniform color of the lean meat.

We have discovered that a uniform color may be assured by soaking cloth in a nitrite solution and spreading the cloth over the surface of the bellies as they are put in cure. The strength of the nitrite solution may vary considerably, but we have found in practice that a 15 per cent solution gives very satisfactory results in most instances.

In carrying out the present invention, bacon bellies are packed in layers in curing vats or boxes. Each layer is surrounded and covered with a curing mixture of any desired formula, but nitrites are omitted from the curing mixture. Cloth soaked in a nitrite solution, for example, a 15 per cent solution, is wrung out fairly dry and spread between each layer of bellies with the necessary additional curing mixture. The bellies remain in cure the usual period of time for the cure desired, and are then washed and smoked in the conventional manner. Any suitable nitrite salt may be employed and in practice we have found sodium nitrite to be effective.

The use of cloths soaked in nitrite solution assures a uniform application of the nitrite. It will be seen, therefore, that the cloth, as employed in this invention, acts as a carrier for nitrite. It will be apparent, of course, that any similar carrier might also be employed.

We claim:

1. The method of curing meat which comprises holding meat in cure with curing agents and in contact with a nitrite containing cloth.

2. The method of curing meat which comprises packing meat in cure in layers with curing agents and a nitrite soaked carrier between each layer of meat.

3. The method of curing meat which comprises packing meat in cure in layers with curing agents and a nitrite soaked cloth between each layer of meat.

4. The method of curing meat which comprises packing cuts of meat in cure in layers with curing agents and a sodium nitrite soaked cloth between each layer of meat.

5. The method of curing bacon bellies which comprises packing bacon bellies in cure in layers with curing agents and a nitrite soaked carrier between each layer of bacon bellies.

6. The method of curing bacon bellies which comprises packing bacon bellies in cure in layers with curing agents and a nitrite soaked cloth between each layer of bacon bellies.

LEVI SCOTT PADDOCK.
CLEO A. RINEHART.